United States Patent [19]
Briane et al.

[11] Patent Number: 4,864,114
[45] Date of Patent: Sep. 5, 1989

[54] METHOD OF AND APPARATUS FOR CONFISCATING A DATA BEARING CARD

[75] Inventors: Alain Briane, Paris; Michel Chevalier, Chevreuse; Joël Bouaziz, Ris Orangis, all of France

[73] Assignee: Bull, S.A., Paris, France

[21] Appl. No.: 906,496

[22] Filed: Sep. 12, 1986

[30] Foreign Application Priority Data
Sep. 12, 1985 [FR] France .................. 85 13559

[51] Int. Cl.⁴ ............................................. G06K 13/20
[52] U.S. Cl. ................................. 235/480; 209/569; 209/583; 235/477; 235/482
[58] Field of Search ................. 209/534, 569, 583; 235/435, 449, 454, 475, 476, 477, 479, 480, 482

[56] References Cited
U.S. PATENT DOCUMENTS

| | | | |
|---|---|---|---|
| 3,765,523 | 10/1973 | Nakarishi | 209/534 |
| 3,850,299 | 11/1974 | Kreitzer | 209/569 |
| 4,007,356 | 2/1977 | Stucke et al. | 235/480 |
| 4,196,846 | 4/1980 | Kao et al. | 235/477 |
| 4,300,041 | 11/1981 | Nama | 235/480 |
| 4,579,228 | 4/1986 | Case | 235/480 |
| 4,704,518 | 11/1987 | Brunn et al. | 235/480 |

FOREIGN PATENT DOCUMENTS 0134110 10/1967 European Pat. Off. .
2445560 7/1980 France .
2477303 9/1981 France .

OTHER PUBLICATIONS
IBM Tech. Disc. Bull., "Document Reverser with Relay", Butterbaugh et al., vol. 10, No. 5, Oct. 1967, p. 637.

Primary Examiner—A. D. Pellinen
Assistant Examiner—Jeffrey A. Gaffin
Attorney, Agent, or Firm—Lowe, Price, LeBlanc, Becker & Shur

[57] ABSTRACT

A data bearing card having first contacts connected to an integrated circuit on the card is read and confiscated if invalid or bogus. The card is translated in a first direction from an admission chamber to a reading station having second contacts adapted to engage the first contacts so data signals can be coupled between the integrated circuit and a data processor. After data stored in the integrated circuit have been read through the contacts the card is fed in a second direction of travel from the reading station back toward the admission chamber until the card has been completely extracted from the reading station. If the card is bogus, the reading station pivots to open a path for the card to a confiscation bin located beneath the reading station. The bogus card is then fed in the first direction into the confiscation bin. The contacts are cleaned because they rub on each other as a result of the reading station and the second contacts thereon being pivoted and translated across the first contacts in response to the card being inserted into the reading station.

14 Claims, 5 Drawing Sheets

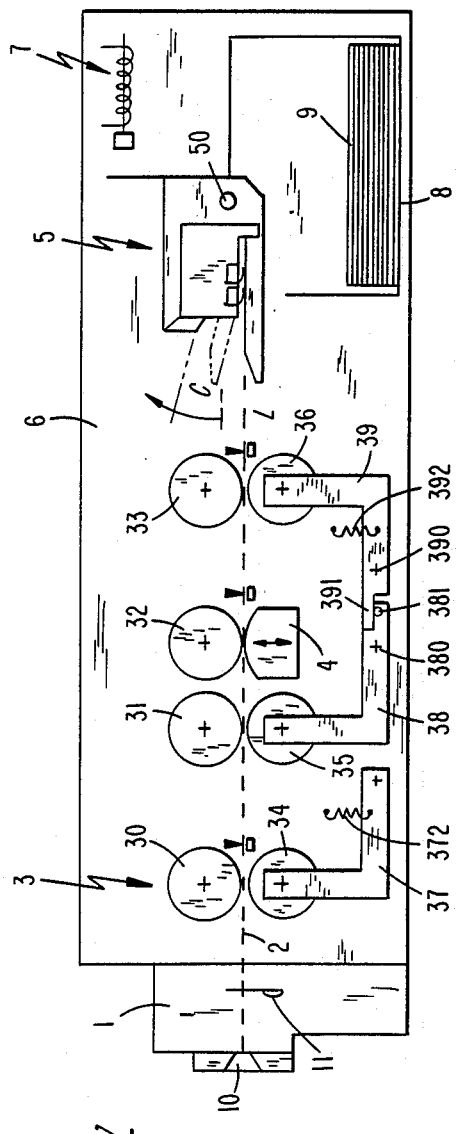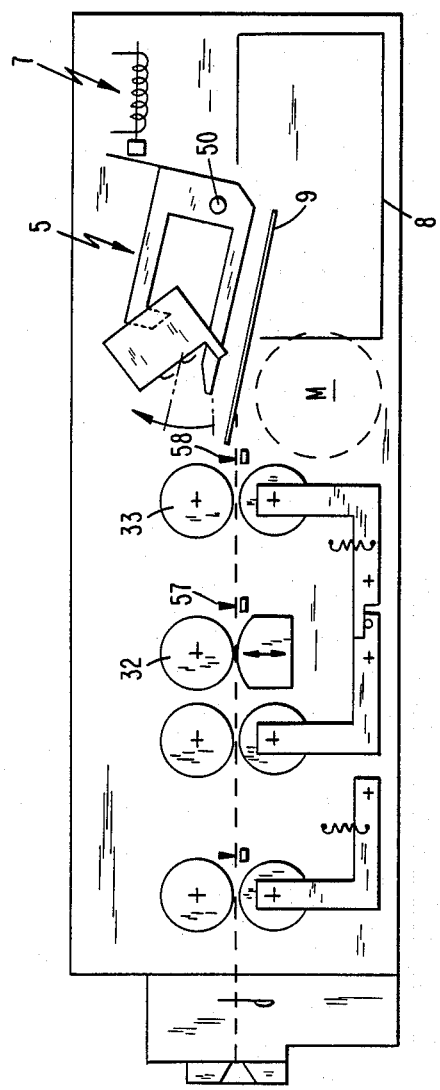

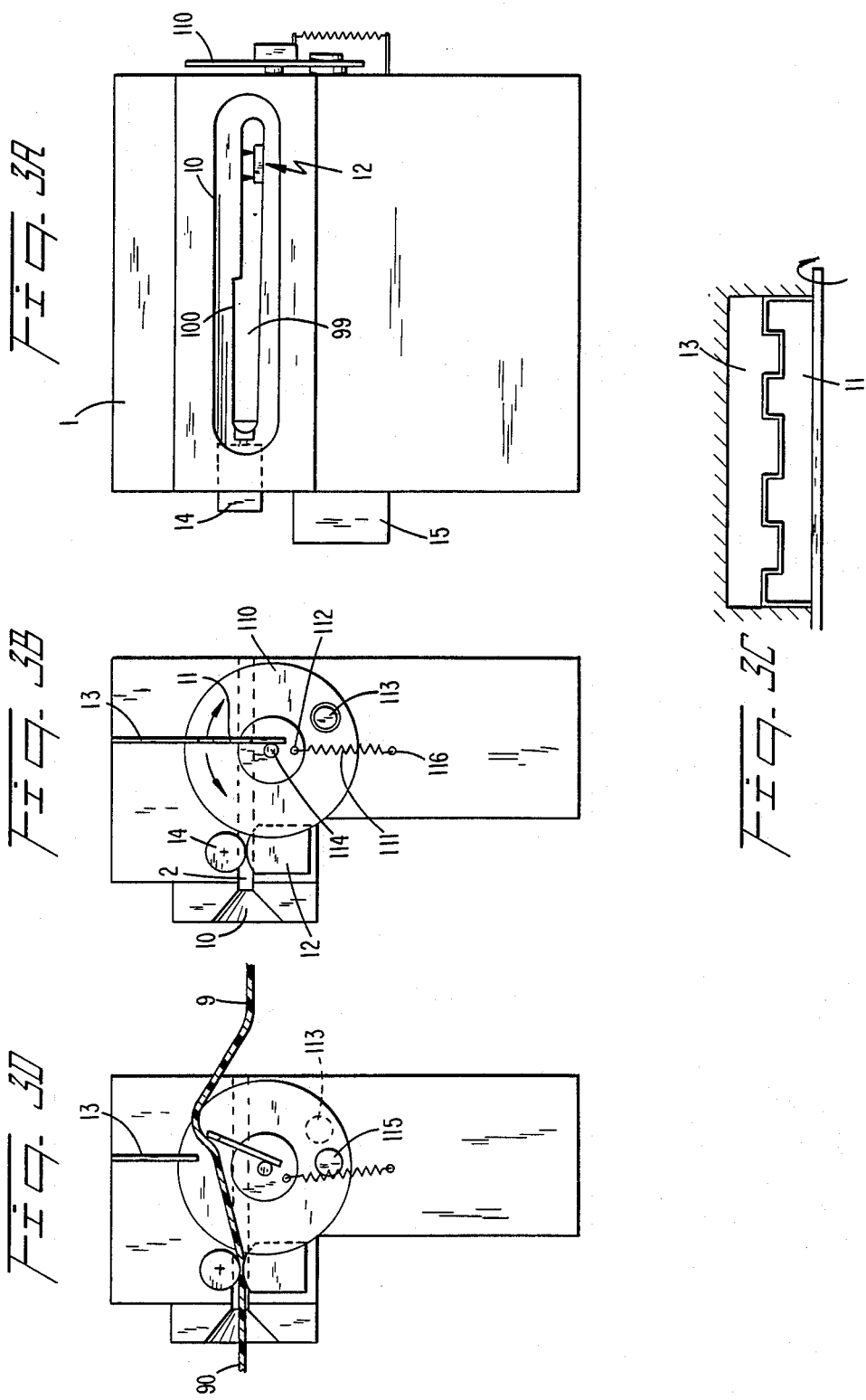

METHOD OF AND APPARATUS FOR CONFISCATING A DATA BEARING CARD

TECHNICAL FIELD

The present invention relates to a method of and apparatus for confiscating a bogus or invalid data bearing identification card that has been inserted into a card reader and more particularly to a confiscator in the form of a bin that is selectively opened in a normal path of the read card so cards to be confiscated are urged from the normal path into the open bin.

BACKGROUND ART

There are prior art data bearing cards, e.g., credit cards, having integrated circuits for storing binary data. Other available cards include magnetic strips for storing data. Some prior art cards, referred to as combination cards, contain integrated circuits and magnetic strips. Readers have been developed for all three of these cards. A reader for a combination card, described in European patent application No. 0,134,110, contains an integrated circuit reading station having first contacts that engage second contacts on the card. The first contacts move perpendicular to the direction of travel of the card after the card is in place at the reading station. The perpendicular movement prevents this type of reader from self-cleaning the contacts of the read head and/or the card. It would be advantageous if self-cleaning could be provided when the first and second contacts engage each other at the time signals are coupled between the integrated circuit on the cards and a data processing unit that determines whether the card is valid and if a transaction is to be authorized.

DISCLOSURE OF INVENTION

An object of the present invention is therefore to obviate the above cited disadvantages by providing a card reader having self-cleaning contacts and the capability of card confiscation, while maintaining the smallest possible size for the reader.

Another object of the invention is to provide a new and improved method of and apparatus for automatically confiscating a bogus data containing card.

The second object is achieved with a card reader comprising, in order, an admission chamber, a guide path having a feeding mechanism for the cards, and a station having contacts that abut against contacts on the card and which are connected to an integrated circuit on the card. The guide path may also include, between the integrated circuit read station and the admission chamber, a read station for a magnetic strip on a combination card. In the confiscation method, a bogus card is driven into the integrated circuit read station 5 in a first direction of travel from the admission chamber.

After the information contained in the integrated circuit on the card has been read and processed, the card is fed in a second direction of travel from the integrated circuit read station toward the admission chamber until the card is completely extracted from the integrated circuit read station. Then, in response to a signal indicating that the card is bogus the processing station is moved to open a normally closed path to a confiscation bin. The card is then fed in the first direction of travel into the confiscation bin.

The first named object is achieved by a reader having an admission chamber, a fixed guide path having a card feeding mechanism, and a station for reading data from an integrated circuit on the card. The integrated circuit read station is mounted to seal off the guide path to prevent valid cards from reaching a confiscation bin. If a card is invalid or bogus, the integrated circuit read station is retracted to open a path for insertion of the card into a confiscation bin located beneath the integrated circuit read station.

To read magnetic data from a strip on a combination card, a read station for the magnetic strip is provided between the admission chamber and the integrated circuit read station. The magnetic strip read station includes a read head on one side of the guide path and a drive roller on the other side. With such a combination the integrated circuit read station is located in an extension of the guide path.

According to a further feature of the invention, the integrated circuit read station is retracted under the control of an electromagnet.

According to a further feature, the integrated circuit read station is arranged so contacts thereof and contacts of the cards are self-cleaning.

The self-cleaning contacts on the integrated circuit reader are formed as a contact unit which travels parallel to the travel direction of the card, which is guided by a cutaway area. The contacts on the contact unit swivel about a spindle during the card travel, resulting in pivoting and translation of the reader contacts with respect to the card contacts so the reader contacts abut against and rub across the card contacts in response to the card being driven into and being withdrawn from the integrated circuit reader. This rubbing action provides the self-cleaning action.

The above and still further objects, features and advantages of the present invention will become apparent upon consideration of the following detailed description of one specific embodiment thereof, especially when taken in conjunction with the accompanying drawings.

BRIEF DESCRIPTION OF DRAWING

FIG. 1 is a schematic side view of a preferred embodiment of a reader of the present invention;

FIG. 3A is a front view of an admission chamber of the illustrated reader;

FIG. 3B is a side view of a sealer for the admission chamber;

FIG. 3C is a rear view of a chamber sealing plate;

FIG. 3D is a side view of the sealing chamber in the case of attempted fraud;

FIG. 6 is a side view of the reader during confiscation of a card.

BEST MODE FOR CARRYING OUT THE INVENTION

Figure 2:
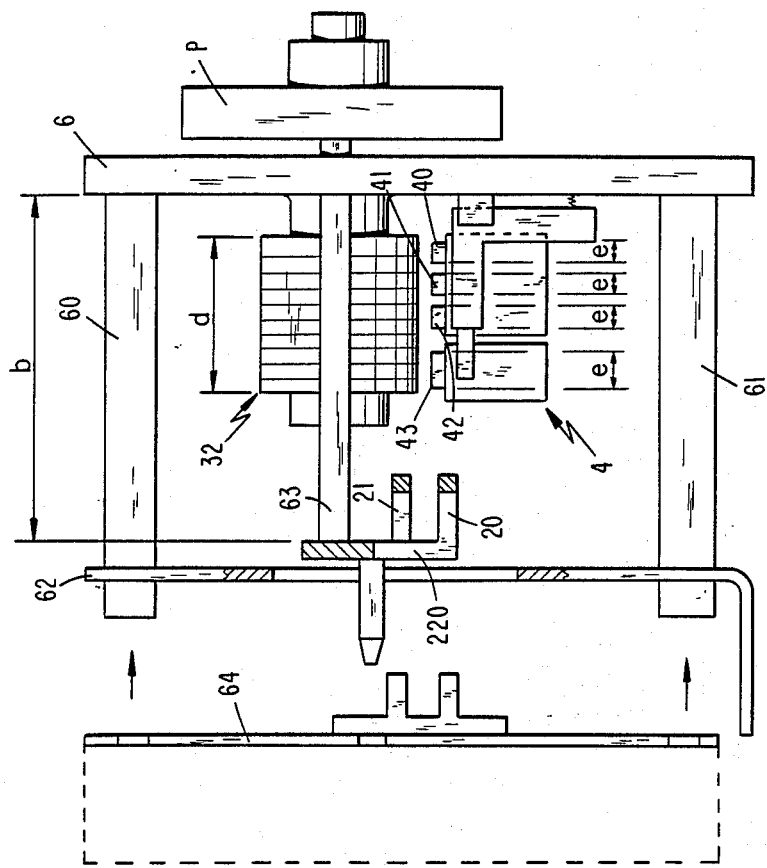
FIG. 2 is a front view of a guide path and feed mechanism of the reader illustrated in FIG. 1.

The card reader comprises in sequence an admission chamber 1, a guide path 2 along which a data bearing identification card 9, e.g., a credit card, travels and a magnetic read head 4. The card is driven by feed mechanism 3, first toward read head assembly 4 for a magnetic track on identification card 9, and subsequently toward read/write station 5 for data contained in a memory of an integrated circuit included in identification card 9. The card reader thus accepts and reads (1) cards having magnetic tracks, (2) cards containing an integrated circuit, and (3) combination cards having both a magnetic track and an integrated circuit.

Card 9 has a tendency to be deformed or bent across the width thereof so that the elongated longitudinal edges thereof are not parallel. The magnetic tracks are formed on a magnetic strip that extends in the lengthwise direction of the card, i.e., at right angles to the axis about which the card is bent. Data bits are magnetically stored on the magnetic strip at successive locations along the tracks so the bits on the different tracks are sequentially read by separate heads in assembly 4 as card 9 travels past the heads. As each card to be read travels past assembly 4 there is a predetermined spatial relationship between a longitudinally extending center line of the card and the assembly.

Station 5 is mounted so it turns about pin 50; electromagnet 7 selectively contacts station 5 to pivot the station between positions L and C. With station 5 in position L information contained in the integrated circuit of card 9 is read; when station 5 is at position C the card is confiscated.

Feed device 3 includes drive rollers 30, 31, 32, 33 against which the card is applied by idler wheels or rollers 34, 35, 36; the idler rollers also apply the card against read head 4. Idler wheels 34, 35, 36 are respectively mounted on L-shaped arms 37, 38, 39, mounted to turn about spindles integral with plate 6. Tension is applied to arms 37-39 by tension springs 372 and 392 that function as an elastic means to maintain idler wheels 34-36 at a predetermined pressure against card 9 during its travel. Idler wheels 35 and 36 surround read heads 4 and are mounted on arms 38 and 39, in turn mechanically connected by pin 381 and a lever 391 such that as card 9 travels between rollers 35 and 31 rollers 36 and 33 are urged to be spread apart. This prevents braking action on card 9 as it leaves read head 4 when the card comes between the two rollers 33 and 36.

Confiscated cards are fed into bin 8 through conical aperture 10 (FIGS. 3A and 3D) and pushed toward sealing plate 11 by the customer.

FIG. 2 is a transverse view of the magnetic strip card reader, i.e., a view taken in the direction the cards travel in the reader; the admission chamber has been removed from the view illustrated in FIG. 2. The reader includes mounting plate 6 for supporting the various components. Mounting plate 6 supports crosspieces 60 and 61. At the ends of crosspieces 60 and 61 remote from plate 6 plate 62 is mounted so it is parallel to plate 6; plate 62 holds printed circuit 64. Mounting plate 6 supports crosspieces 63 which maintain guide path 2 at a distance b from the mounting plate. Guide path 2 includes bifurcated bracket 220 containing prongs 20 and 21, having a gap between them that lies in a plane parallel to the axes of crosspieces 63 that extends between drive roller 32 and magnetic head assembly 4. The plane parallel to the axes of crosspieces 63 is also between the peripheries of rollers 30-33 and idler wheels 34-36. Drive roller 32 has a minimum width d covering at least the full width e of all of magnetic read head components 4 which contact the magnetic cards. This prevents undesirable torque in an oblique direction relative to the desired rectilinear trajectory which is parallel to the predefined path of the card in the reader.

Figure 4B:
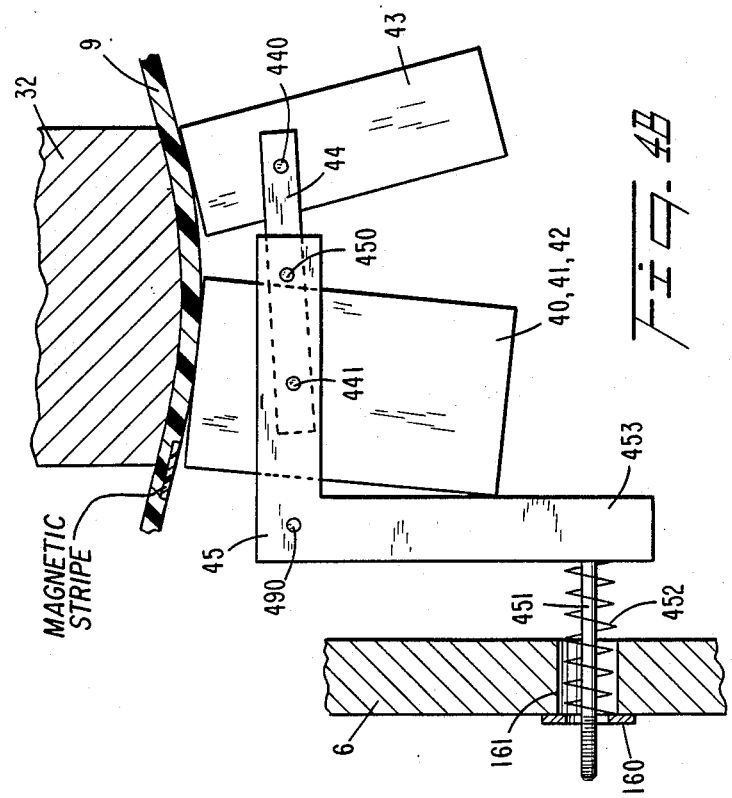
FIG. 4B is a side view, in the same direction as the card travel direction, of the read heads operating on a deformed card.
Figure 4A:
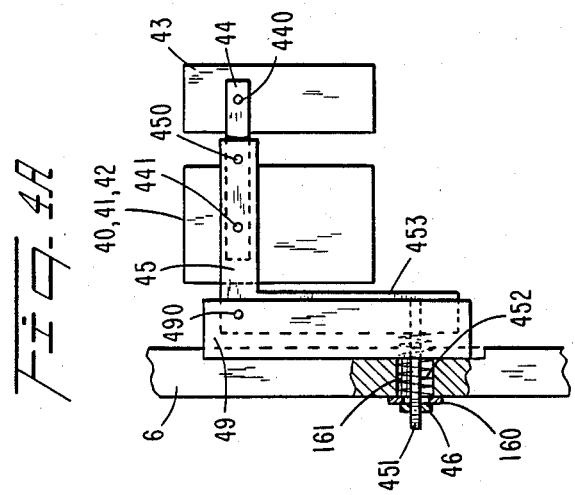
FIG. 4A is a side view of the read heads of the illustrated reader.

Assembly 4 comprises read heads 40, 41, 42 which are jointly mounted in a single unit and a fourth separately mounted read head 43. Head assembly 4 is mounted on two swing arms 44, positioned on opposite sides of heads 40-43, and by bifurcated support bracket 45 (only one of arms 44 is illustrated in FIGS. 4A and 4B). Head 43 is articulated about swing arms 44 by spindle 440, situated at one extremity of the swing arms, having a longitudinal axis parallel to the direction of the card guide path. Heads 40-42 are grouped in a single subassembly that is articulated about spindle 441, supported at the end of swing arms 44 opposite from spindle 440; the longitudinal axes of spindles 440 and 441 are parallel to each other.

At the end of bifurcated support bracket 45 is mounted spindle 450 which traverses the center of swing arms 44 such that the swing arms are articulated about bifurcated bracket 45. Bifurcated bracket 45 is in turn articulated about spindle 490, an integral part of two end plates 49 (only one of which is illustrated). Plates 49 are positioned on opposite sides of head assembly 4 and are integral with mounting plate 6. Bifurcated bracket 45 has an L-shaped profile including leg 453 which does not support pivoting spindle 450. Leg 453 carries (1) threaded stud 451 which extends through bore 61 and a hole in plate 6, and (2) guide rod washer 60, integral with the plate. Aligned tension spring 452 passes through bore 61 and has opposite ends abutting against opposed faces of washer 60 and leg 453 of bifurcated bracket 45. As nut 46 is screwed onto stud 451 the play between heads 40-43 and drive roller 32 facing them is adjusted. Rollers 30 are mounted with ball bearings on a drive shaft (not shown) in turn driven by motor M (FIG. 5) through a system comprising a belt (not shown) and pulley P (FIG. 2). The various motor components, magnetic read heads, integrated circuit memory read head, and locking device are controlled by an electronic circuit on a printed circuit card integrally mounted on crosspieces 60 and 61.

Reference to FIG. 4B reveals the advantages of the magnetic read head assembly of the invention as it pertains to deformed card 9. Deformed card 9 is accurately read by read heads 40-44 because the linkage system between bifurcated bracket 45 and swing arms 44 causes the heads to abut against the corresponding magnetic tracks. A nip is thus formed between the periphery of roller 32 and surfaces of heads 40-42 and head 43 having surfaces that are urged against a first face of card 9 and roller 32 that abuts against a second face of the card. Heads 40-42 bear against the portion of the card first face on one side of the center line while head 43 is urged against the card first face on a second side of the center line. If the card does not include magnetic tracks on opposite sides of the center line, head 43 can be replaced by a member having a card urging surface. This system enables the tracks to be accurately read even if the card is deformed due to wear of feed roller 32, as illustrated in FIG. 4B.

Admission chamber 1 is mounted such that it can move relative to plate 6, as illustrated in FIGS. 3A-3C. Chamber 1 includes an opening 10 shaped in a vertical cross-section as a truncated cone. Opening 10 has a mouth in a vertical face of chamber 1 through which card 9 is inserted. Opening 10 tapers in the vertical cross-section toward the back of chamber 1 to provide access for card 9 to guide path 2 into slot 99 having an asymmetrical notch 100. Notch 100 extends vertically on the left half of slot 99, as illustrated in FIG. 3A, to form a foolproofing mechanism for embossed magnetic cards. Behind foolproofing opening 10 is fixedly mounted a magnetic track detection system in the form of magnetic head 12. At the same height as magnetic head 12, positioned laterally relative to opening 10 through which cards 9 are inserted, is switch 14 to detect the width of the inserted cards.

Behind head 12 and switch 14, in the direction of forward movement of card 9, cover plate 11 is fixedly mounted on rotating spindle 114, at one end of which is fixedly mounted disk 110. Plate 11 is rocked back and forth between open and sealed positions for guide path 2. Opposite ends of compression spring 111 are connected to studs 112 and 116, respectively fixedly mounted on disk 110 and a wall of admission chamber 1 to urge cover plate 11 back to the position where it seals off guide path 2. The seal is provided by fixed plate 13 dovetailing with mobile plate 11. As illustrated in FIG. 3C, plates 11 and 13 have dovetailing crenelations, i.e., interdigitated gaps and extensions, to form anti-fraud baffles.

In disk 110 is an aperture through which lock bolt 113 is inserted; lock bolt 113 is an integral part of a piston core of an electromagnet (not shown). Conventional detector 15 determines whether disk 110 is locked. Detector 15 may, for example, be a switch to detect the electromagnet piston core position. In a conventional manner, when head 12 detects a card magnetic track and detector 14 signals that a correct card width has been detected, a conventional control system causes disk 110 to be unlocked by removing bolt 113 and the card inserted by the customer causes cover plate 11 to swivel. Because the length of admission chamber 1 in the direction of travel of card 9 is less than the card length, the card traverses the admission chamber and is then caught between feed roller 30 and idler wheel 34; thence, card 9 is fed by the device mounted on mounting plate 6.

In FIG. 3D is illustrated the advantage of the device for sealing chamber 1 in the case of attempted fraud wherein a fraudulent card 9 includes strip 90 made of flexible metal fibers that extend from one edge of the card 9; bank card 9 contains at least one microprocessor or integrated circuit system. Card 9 and flexible fiber strip 90 establish a communication link between contact regions 52 and a bank computer system to enable initiation of a detection sequence for a fraudulent card used by a malefeasor. If the card is fraudulent, fiber strip 90 and a baffle system formed by the cover plates 11 and 13 prevent disk 110 from returning to its closed position and consequently prevents insertion of locking bolt 113 into hole 115. In this case, the device detects that admission chamber 1 is not locked and it does not allow any transaction, consequently the malefeasor does not gain access to information in the bank system.

Figure 5:
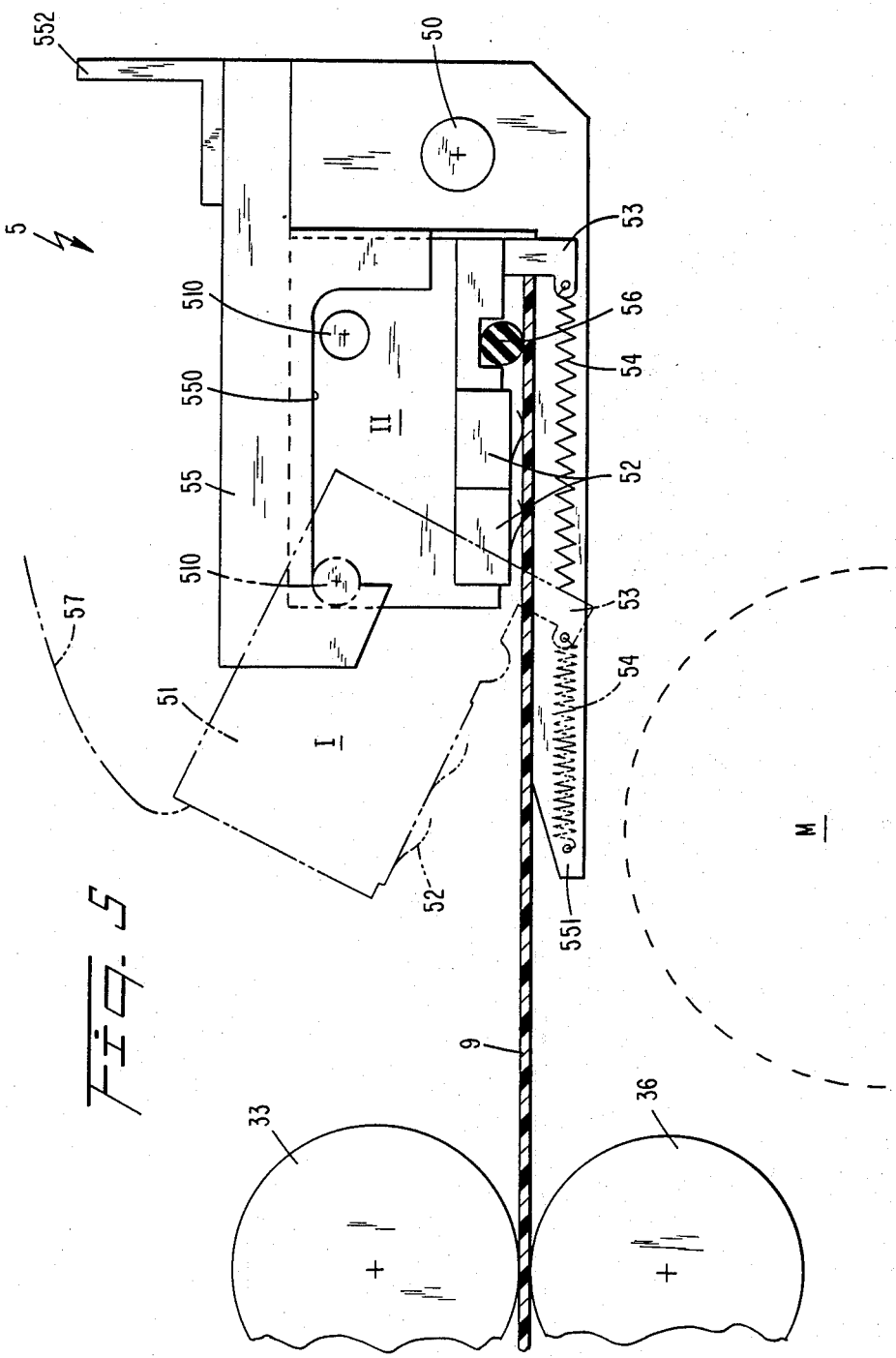
FIG. 5 is a side view of a read station including the integrated component.

In FIG. 5 is illustrated the condition of the reader when card 9 is introduced by feed roller 33 and idler wheel 36 into a slot in integrated circuit read/write device 5 for cards containing integrated circuits. This device comprises a mobile unit 51 that is translated back and forth in the direction of card travel and is rocked about an axis at right angles to the card travel direction. On the lower part of unit 51 is supported a series of electric contact regions 52 and a rubber ring 56 positioned in a groove such that the ring comes to rest against card 9 when read unit 51 is in the working position, represented by reference II. Read unit 51 is mounted to move within housing 55, articulated about pivoting spindle 50, which is an integral part of mounting plate 6. Housing 55 has a horizontally extending lower lip 551 that carries longitudinally extending tension spring 54, having opposite ends connected to a post on the free or forward extremity of lower lip 551 and to a post on the end of lug 53 at the lower rear part of read block 51. A lever or spindle 510 integral with read block 51 is mounted at the top rear part thereof to translate in cutaway 550 parallel to lip 551 in the same direction as card travel. Spindle 510 is mounted in housing 55 to guide the travel of unit 51 between idle position I and working position II.

While unit 51 travels between positions I and II, contact regions 52 travel across card 9 which causes self-cleaning of the involved contact surfaces on the card and of regions 52. Flexible cable strip 57, mounted on the forward face of unit 51, toward the top of the unit, provides electrical connections between contact regions 52 and the device (not shown) for processing the information contained in the integrated circuit of the card. Iron plate 552, integral with support 55, provides a low reluctance path for the core of electromagnet 7, to enable integrated circuit read/write assembly 5 to be swiveled about spindle 50 to an upper position wherein a card to be confiscated can be dropped through an opening in the top of card confiscation bin 8 (as illustrated in FIG. 6). Photoelectric sensors 57 and 58, positioned in the card path, determine the card position and enable the logic control circuit to initiate the various actions needed for operation of the reader.

The operation of the integrated circuit read/write station and of the card confiscation device is now described by referring to FIGS. 5 and 6. During normal operation with a combination card containing magnetic strip and integrated circuit memories, card 9 is pushed by its user so it crosses admission chamber 1, and is advanced along its path by rollers 30–33, driven by motor M. Rollers 30 and 31 drive card 9 to and through magnetic track read station 4, thence the card is fed by rollers 32 and 33 toward integrated circuit read/write station 5. The card fed by rollers 32 and 33 comes to rest against lug 53 of read unit 51 which is in rest position I, FIG. 5. Card 9, being propelled by drive roller 33, causes read assembly 51 to be translated and rocked to working position II through the action of return spring 54. During this travel of assembly 51, contact regions 52 are driven so they abut against the contact points of the integrated circuit installed on card 9. When read unit 51 arrives at position II, drive motor M for rollers 30–33 is stopped in response to the integrated circuit read/write unit engaging a microswitch (not shown) mounted on station 5 at the end of the read/write unit travel. When the transaction has occurred in normal fashion, motor M is energized in the reverse direction to reverse the driven direction of rollers to feed card 9 backwards so it is returned to its owner.

At the end of the transaction, if the detecting device determines that the card is to be confiscated, the illustrated apparatus operates as follows. When the transaction is performed through electric cable 57 between the bank system and the integrated circuit on card 9, a command to activate drive rollers 30–33 in a special sequence is transmitted to the reader. In response to the command a clutch (not shown) between drive motor M and roller 33 is activated to reverse the rotation direction of only roller 33 so card 9 is extracted from a housing defined by lip 551 and the lower face of unit 51 including contact regions 52. If the card is to be confiscated, as soon as photoelectric sensor 58, positioned between roller 36 and integrated circuit read/write unit 5, detects the absence of the card, that is, when the card is at magnetic read station 4, logic circuitry in the electronic circuit mounted on plate 62 generates a command to activate electromagnet 7. Electromagnet 7, when activated, swivels integrated circuit read/write unit 5 into the confiscation position illustrated in FIG. 6. After block 5 has swiveled, a clutch (not shown) between the drive shaft of motor M and rollers 32 and 33 is activated, so that the rotation direction of the rollers is again reversed to cause card 9 to be fed by rollers 32 and 33 into confiscation bin 8.

The same operations occur for cards having only magnetic strips or for cards having only an integrated circuit. In all three cases the guide path is the same and the operations are the same, regardless of whether the magnetic card reader and/or integrated circuit card read/write unit detects the signals on the card. In all three types of cards a signal from a remote device signals logic circuitry on plate 62 to activate electromagnet 7 to cause unit 5 to be activated to the confiscation position illustrated in FIG. 6.

While there been described and illustrated one specific embodiment of the invention, it will be clear that variations in the details of the embodiment specifically illustrated and described may be made without departing from the true spirit and scope of the invention as defined in the appended claims.

We claim:

1. A reader for data stored in an integrated circuit on a card having electric contacts connected to the integrated circuit, the reader comprising an admission chamber, a fixed guide path including means for feeding the card, the guide path including the admission chamber and a station for reading data from integrated circuit cards, the station for reading being normally positioned to seal off the guide path from a confiscation bin, and means for retracting the station for reading to open the path for insertion of the card into the confiscation bin.

2. The reader of claim 1 wherein the bin is located beneath the station for reading so an invalid card falls by gravity through the open path into the bin.

3. The reader of claim 1 wherein the card includes a magnetic track, the reader including a further station for reading the magnetic track, the station for reading the magnetic track including a magnetic read head on one side of the guide path and a drive roller for the card on the other side of the guide path.

4. The reader of claim 1 further including an electromagnet for controlling retraction of the station for reading data from integrated circuit cards.

5. The reader of claim 1 further including means for mounting the station for reading integrated circuit cards to cause the contacts thereof to be cleaned by being rubbed against the card contacts.

6. The reader of claim 5 wherein the contacts at the station for reading integrated circuit cards are included on a block, and means for activating the block so it travels generally in the direction of card travel as guided by a cutaway, said block and the contacts thereon being mounted so the block pivots about a horizontal axis and the contacts at the station for reading integrated circuit cards are moved relative to contacts on the card so that contacts at the station for reading integrated circuit cards rub against integrated circuit contacts during travel of the card into the station for reading integrated circuit cards.

7. Apparatus for confiscating a data bearing card in response to data read from the card causing a confiscating command signal to be derived comprising means for reading data from the card; a confiscating bin having an opening through which confiscated cards can pass; means for normally closing the opening in a path traversed by the card; said path including: (a) an entrance slot through which the card passes in a first direction as it travels toward the reading means and through which the card normally passes in a second direction, opposite to the first direction after it has reached the reading means, (b) the reading means, and (c) said means for normally closing the opening in the path; means for driving the card in the first and second directions so that the card as it normally travels through said path travels in the first and second directions through the entrance slot; and means responsive to the confiscating command signal for activating said means for driving and said means for normally closing to cause: (a) the direction of card movement through the path to be reversed after the card has reached and started to return toward the entrance slot after reaching the means for reading and the means for closing and prior to the card reaching the entrance slot, and (b) the opening to be in the path after the direction of card movement has been reversed so cards causing derivation of the confiscating command signal pass through the opening into the bin instead of passing back through the slot after having been read by the reading means.

8. Apparatus for confiscating a data bearing card in response to data read from the card causing a confiscating command signal to be derived comprising means for reading data from the card; a confiscating bin having an opening through which confiscated cards can pass; means for normally closing the opening in a path traversed by the card; said path including: (a) slot means through which the card passes in a first direction as it travels toward the reading means and through which the card normally passes after it has traveled through the reading means, (b) the reading means, and (c) said means for normally closing the opening in the path; means for driving the card through said path; and means responsive to the confiscating command signal for activating said means for normally closing to cause the opening to be in the path so cards causing derivation of the confiscating command signal pass through the opening into the bin instead of passing through the opening means after having been read by the reading means; the reading means being included in the means for normally closing; the means for driving including means for withdrawing every card from the reading means and the means for normally closing by driving every card in a second direction opposite to the direction it was initially driven into the reading means, the first and second directions being opposite, the activating means energizing the means for normally closing so the opening is in the path only after the read card has been withdrawn from the reading means, the means for driving including means responsive to derivation of the command signal to drive the card causing derivation of the confiscating command signal in the first direction through the opening into the bin after the card has been driven in the second direction and prior to the card again travelling through the entrance slot.

9. Apparatus for confiscating a data bearing card in response to data read from the card causing a confiscating command signal to be derived comprising means for reading data from the card; a confiscating bin having an opening through which confiscated cards can pass; means for normally closing the opening in a path traversed by the card; said path including: (a) an entrance slot through which the card passes in a first direction as it travels toward the reading means and through which the card normally passes after it has traveled through the reading means, (b) the reading means, and (c) said means for normally closing the opening in the path; means for driving the card through said path; and means responsive to the confiscating command signal for activating said means for normally closing to cause the opening to be in the path so cards causing derivation of the confiscating command signal pass through the opening into the bin instead of passing through the opening means after having been read by the reading means; the card including first electric contacts having a tendency to become dirty; the reading means including second electric contacts for engaging the first electric contacts while the card is in the reading means; the reading means being included in the means for normally closing; means for mounting the means for reading so that, in response to the card being driven by the drive means into the means for normally closing, the second contacts are driven from a first position out of engagement with the first contacts to a second position in abutting relation with the first contacts, the reading means being mounted and driven so the second contacts are turned and translated to rub across and clean the first contacts when the second contacts are driven between the first and second positions.

10. The apparatus of claim 9 wherein the means for driving includes means for withdrawing every card travelling through the reading means from the reading means and the means for normally closing by driving every card in a second direction opposite to the direction it was initially driven into the reading means, the first and second directions being opposite, the activating means energizing the means for normally closing so the opening is in the path only after the card has been withdrawn from the reading means, the means for driving including means responsive to derivation of the command signal to drive the card in the first direction through the opening into the bin after the card has been driven in the second direction.

11. A method of confiscating invalid or bogus cards having data stored on a magnetic strip and/or an integrated circuit memory, the method being performed with the cards being read by a unit having: an admission chamber, a guide path with a mechanism for feeding cards to a first magnetic strip reading station thence to a second station having electric contacts adapted to be connected to contacts on the cards, the contacts at the second station and on the cards when connected to each other being connected to an integrated circuit memory on the cards having same, the card being positioned in the guide path, the method comprising:

introducing each card into the unit by feeding the card in a first direction of travel from the admission chamber in sequence to the first and second stations;

processing data stored on the card as read by at least one of said stations to determine whether the card is valid or invalid;

then sequentially feeding the cards in a second direction of travel from the second station back toward the admission chamber until the invalid card is completely extracted from the second station;

then in response to the card being detected as being invalid moving the second station to open the path to a confiscation bin;

then and before the card has passed back completely through the first station feeding the invalid card in the first direction of travel into the confiscation bin; and in response to the card being detected as valid continue to feed the card backward through the first station into the admission station so it can be removed from said admission circuit.

12. A method of confiscating invalid or bogus cards having data stored thereon, the method being performed by a unit having: an admission chamber and a guide path with a mechanism for feeding cards to a station for reading the data on the cards, the method comprising:

introducing each card into the unit by feeding the card in a first direction of travel from the admission chamber, thence to the station via the guide path;

reading the data on the card while the card is at the station;

in response to the data read from the card while the card is at the station, deriving a signal to indicate whether the card is or is not to be confiscated;

reversing the direction of the cards so that the cards travel toward the admission chamber via the guide path;

in response to the signal indicating that the card is not to be confiscated, driving the cards which are not to be confiscated back to the admission chamber via the guide path; and in response to the signal indicating that the card is to be confiscated, reversing the direction of the cards that are to be confiscated after they have left the station and have begun to travel back to the admission station and prior to the card reaching the admission station; and feeding the cards to be confiscated in the direction of travel via the guide path toward the station and away from the admission chamber into a confiscation bin for the cards to be confiscated.

13. An apparatus for confiscating a data bearing card in response to data read from the card causing a confiscating command signal to be derived comprising a station for reading data from the card, a confiscating bin having an opening through which confiscated cards can pass, means for normally closing the opening in a path traversed by the card, said path including an admission chamber through which the card passes in a first direction as it travels toward said station and said means for normally closing the opening in the path; said station for reading data from the card normally positioned to seal off the guide path from the confiscation bin, and means for retracting the station to open the path to the opening into the bin for insertion of cards to be confiscated while the cards to be confiscated are traversing the path above the opening, whereby the cards to be confiscated fall by gravity through the opening into the bin.

14. Apparatus for confiscating a data bearing card in response to data read from the card causing a confiscating command signal to be derived comprising a station for reading data from the card normally positioned to seal off the guide path from a confiscation bin, and means responsive to the confiscating command signal for retracting the station so the path is open for insertion of the card into the bin at the time the card reaches the station.

* * * * *